United States Patent
Rosenkranz et al.

(10) Patent No.: US 11,759,968 B1
(45) Date of Patent: Sep. 19, 2023

(54) ULTRASONIC TOOL AND METHOD FOR MACHINING A WORKPIECE BY MEANS OF MECHANICAL ULTRASONIC OSCILLATIONS

(71) Applicant: Herrmann Ultraschalltechnik GmbH & Co. KG, Karlsbad (DE)

(72) Inventors: Tobias Rosenkranz, Ettlingen (DE); Ulrich Vogler, Uhldingen-Muehlhofen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 0 days.

(21) Appl. No.: 18/109,818

(22) Filed: Feb. 14, 2023

Related U.S. Application Data

(63) Continuation of application No. PCT/EP2022/074657, filed on Sep. 5, 2022.

(51) Int. Cl.
*B29C 65/08* (2006.01)
*B26D 7/08* (2006.01)

(52) U.S. Cl.
CPC ............. *B26D 7/086* (2013.01); *B29C 65/08* (2013.01)

(58) Field of Classification Search
CPC ................................ B29C 65/08; B26D 7/086
USPC ......................................................... 156/73.1
See application file for complete search history.

(56) References Cited

U.S. PATENT DOCUMENTS

| | | | |
|---|---|---|---|
| 5,637,947 A | 6/1997 | Kising et al. | |
| 7,802,604 B2 | 9/2010 | Martin et al. | |
| 8,601,927 B2 * | 12/2013 | Geiss | B26D 7/2614 |
| | | | 83/698.21 |
| 9,427,914 B2 | 8/2016 | Heeg | |
| 10,850,309 B2 | 12/2020 | Rizk | |

FOREIGN PATENT DOCUMENTS

| | | |
|---|---|---|
| EP | 079088 A2 | 8/1997 |
| EP | 2881184 A1 | 11/2014 |
| EP | 3308377 B1 | 6/2016 |
| WO | 9614202 A3 | 5/1996 |
| WO | 2007020208 A2 | 2/2007 |
| WO | 2007020208 A3 | 2/2007 |

OTHER PUBLICATIONS

Milewski, et al., Modelling and Designing of Ultrasonic Welding Systems, Archives of Acoustics, vol. 40, No. 1, pp. 93-99 (2015).
Yao, et al., Power ultrasound and its applications: A state-of-the-art review, Ultrasonics—Sonochemistry 62 (2020), Oct. 31, 2019.

* cited by examiner

*Primary Examiner* — James D Sells
(74) *Attorney, Agent, or Firm* — PAUL & PAUL

(57) ABSTRACT

Ultrasonic tool and method for machining a workpiece by means of mechanical ultrasonic oscillations.

30 Claims, 7 Drawing Sheets

Figure 1:
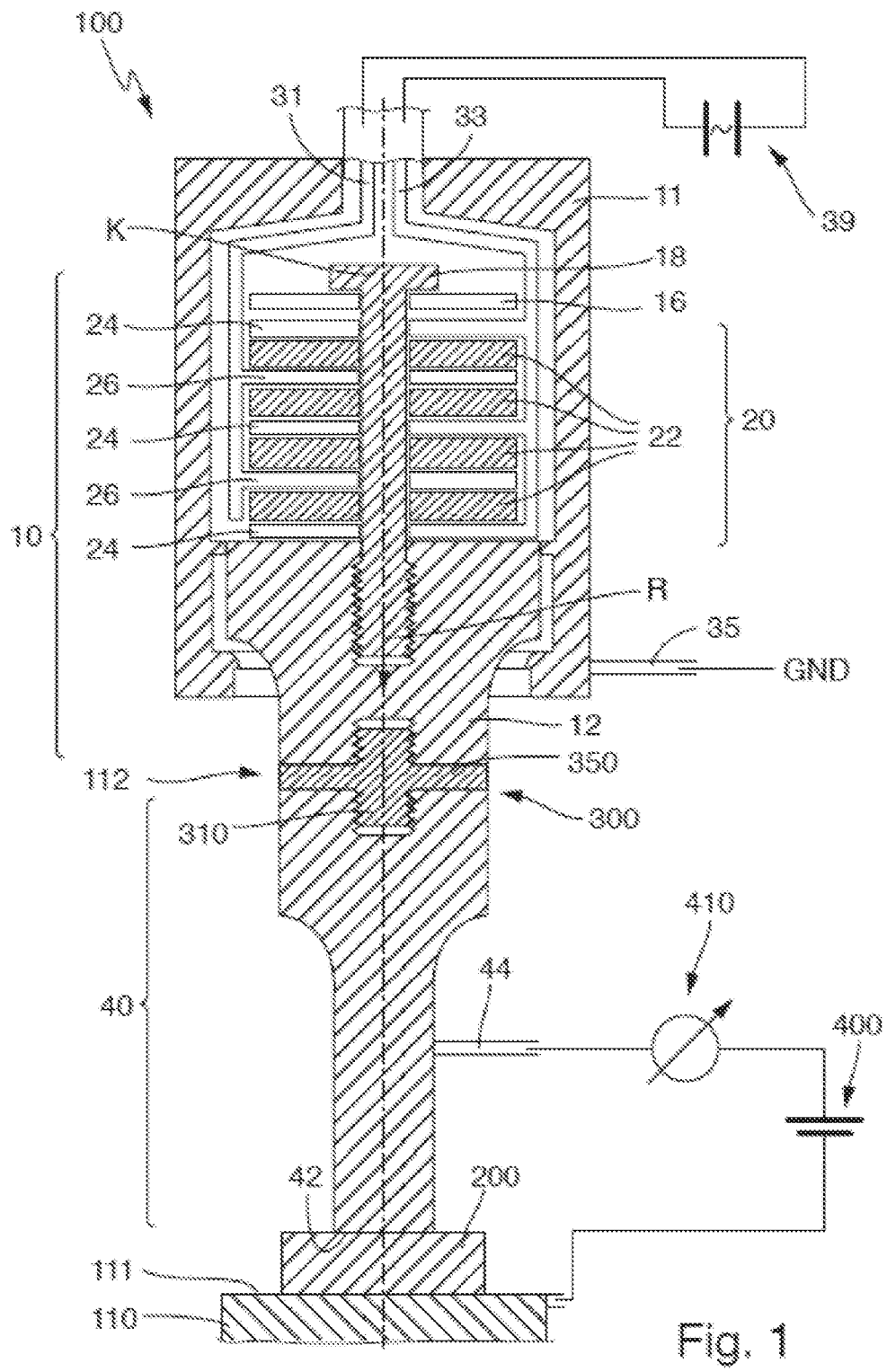

ULTRASONIC TOOL AND METHOD FOR MACHINING A WORKPIECE BY MEANS OF MECHANICAL ULTRASONIC OSCILLATIONS

CROSS-REFERENCE TO RELATED APPLICATION

This application is a continuation of International Application PCT/EP2022/074657, filed Sep. 5, 2022, which is incorporated herein in its entirety by reference.

DESCRIPTION

The present invention relates to an ultrasonic tool and a method for machining a workpiece by means of mechanical ultrasonic oscillations.

For example, ultrasonic tools are employed in order to weld or separate parts, particularly webs of material. For this purpose, ultrasonic tools have an ultrasonic vibrating unit comprising a converter member and a sonotrode. The sonotrode can be connected directly to the converter member or to the converter member via an amplitude booster.

The workpiece, for example a plastic film, is usually arranged on a counter tool (anvil), wherein the workpiece can also be conveyed continuously via the counter tool. In any case, when machining the workpiece, the workpiece is located between the sonotrode and the counter tool.

The converter member comprises a converter, which typically comprises several piezoelements and converts the applied electric AC voltage, which is generally provided by a generator, into a mechanical movement of the same frequency. Each piezoelement is connected to a phase conductor of the generator on the one hand and to a neutral conductor of the generator on the other hand. If an AC voltage is applied to these conductors, the piezoelements alternately become longer and shorter, thus generating an ultrasonic oscillation.

The piezoelements are often arranged in a converter housing, which serves to protect the piezoelements as far as possible against environmental influences. The converter housing is often connected to the neutral conductor and thus lies at its potential.

If the line between generator and neutral fails, for example breaks, a fault can occur. The phase conductor supplies further charge, and the piezoelements are further stimulated. At the other end of each piezo element, a potential arises as a result, but this cannot be dissipated via the neutral conductor due to the fault. This potential is then also applied to the converter housing. For reasons of occupational safety, this is undesirable, because bystanders can come into contact with energized components in this way. The problem is usually solved by additionally grounding the converter housing by means of a protective conductor.

At the same time, in some cases, a contact between the sonotrode and the counter tool is to be detected. For example, it is known from EP 0 790 888 B1 that a change in the resistance, current flow, or voltage between the sonotrode and the counter tool is to be detected by means of a measuring device. A grounding of the converter housing by means of a protective conductor has not yet been possible there. Thus, in the past, extensive safety precautions have been necessary in these applications, for example extensive insulation of the piezoelements in the converter housing.

The problem addressed by this invention is therefore to improve the occupational safety of ultrasonic tools in which a contact between the sonotrode and counter tool is to be detected.

This problem is solved by an ultrasonic tool according to claim 1.

This problem is solved by an ultrasonic tool for machining a workpiece by means of mechanical ultrasonic oscillations with a converter member and a sonotrode, wherein the converter member comprises a converter comprising at least one piezo element, wherein the converter member comprises a phase conductor for a supply of an electric AC voltage and a neutral conductor. The phase conductor and the neutral conductor form the two poles for the converter or at least one piezo element. The at least one piezo element is arranged so to convert an electric AC voltage into a mechanical ultrasonic oscillation. The converter member can be set into a resonance oscillation with a mechanically ultrasonic oscillation of the wavelength $\lambda$ and is mechanically coupled to the sonotrode. The sonotrode and the converter member are tuned to one another such that the sonotrode can set into resonance oscillation with the mechanical ultrasonic oscillation of the wavelength $\lambda$. The sonotrode has a sealing surface, which is provided so as to contact the workpiece to be machined. The sealing surface of the sonotrode and the neutral conductor are galvanically isolated. In the event of a fault, there can be a potential on the neutral conductor that is not dissipated. The galvanic isolation prevents this potential from being transferred to the sealing surface.

Preferably, the phase conductor is also galvanically isolated from the sealing surface of the sonotrode.

The piezoelements are typically arranged one behind the other along a converter axis.

The piezo washers are polarized so as to deform in response to applied voltage. The piezo washers have a positive side and a negative side. The positive sides of all piezo washers are connected to the same pole, for example the phase conductor, and the negative sides are all connected to the other pole, in this example the neutral conductor. This ensures that the piezo washers all deform in a uniform manner, i.e. at a certain voltage all piezo washers are expanded (lengthened) or contracted. The piezo washers are preferably arranged in reverse polarization one behind the other along the converter axis so that two adjacent piezo washers from the same electrode (contact washer) lying between them can be contacted.

An AC voltage source, also known as an ultrasonic generator, is preferably provided so as to generate the AC voltage. The AC voltage source is connected to the phase conductor and the neutral conductor.

For example, the converter member and the sonotrode can be arranged in a propagation direction of the ultrasonic oscillation in succession. Both the converter member and the sonotrode can have a length of $\lambda/2$ or a multiple of $\lambda/2$ in this propagation direction. This ensures that, in the event of stimulation with an oscillation of the wavelength $\lambda$, a standing wave with an oscillation maximum is formed at the interfaces of the sonotrode and converter member due to reflections of the ultrasonic oscillation at the end of the oscillation stack. The propagation direction can run along the converter axis, but it is also possible, for example, for the converter axis and propagation direction to be perpendicular to one another. The propagation direction runs in particular from the converter towards the sonotrode and/or towards the sealing surface of the sonotrode.

The machining of the workpiece refers in particular to cutting, joining, and welding the (multi-part) workpiece.

The entirety of sonotrode and converter member as well as an amplitude booster optionally arranged between the sonotrode and converter member is also referred to as the oscillating stack. When an amplitude booster is used, it is also configured such that it can be set into resonance oscillation with an oscillation with the wavelength $\lambda$. The amplitude booster also advantageously has a length of $\lambda/2$ or a multiple of $\lambda/2$ in the propagation direction.

Preferably, the oscillating stack is held (clamped) in a bracket, wherein the bracket preferably engages with the sonotrode, in particular in the region of an oscillating node. Alternatively, the bracket can also engage with the amplitude booster, the converter member, or several of the components. The bracket of the ultrasonic oscillation unit can occur in a known manner, e.g. as disclosed in WO 96/14202 A2. A plurality of brackets are known to the person skilled in the art, so that a special bracket has not been shown here for reasons of clarity.

In advantageous further developments, the bracket is also provided with a galvanic isolation in order to prevent a grounding of the sonotrode via the bracket. It is particularly advantageous for the bracket to engage behind the galvanic isolation, proceeding from the sealing surface of the sonotrode. The additional insulation of the bracket can thus be omitted. In this case, the bracket does not have any additional insulation.

A galvanic isolation is understood to mean a device that prevents a current flow between the neutral conductor and the sealing surface. This can and will typically be an electrical insulation. However, it is also conceivable that a line connected to the neutral conductor via electrically non-conductive coupling elements is connected to the sealing surface of the sonotrode, which permits the exchange of signals, for example by means of induction. In the case of electrical insulation, on the other hand, the circuits have no effect on one another. In other words, an electrical insulation is hereinafter referred to when galvanic isolation is present and signal exchange is also excluded.

In advantageous further developments, it is provided that the sonotrode comprises an electrically connected signal terminal connected to the sealing surface for an electrical signal voltage, wherein the neutral conductor and the signal terminal are galvanically isolated and preferably electrically insulated from one another. A signal voltage is applied in particular when a contact between the sealing surface of the sonotrode and a further part, for example a counter tool (anvil), is to be detected (contact detection). The galvanic isolation of the neutral conductor and the signal terminal ensures that the signal voltage is not dissipated by the neutral conductor and that the signal voltage and no other voltage is always applied to the sealing surface in the event of a fault. This protects the contact detection against disruptive influences and also prevents persons from coming into contact via the sonotrode with high potentials that do not correspond to the signal voltage.

If the bracket engages with the sonotrode, it preferably comprises a galvanic isolation, wherein a part of the bracket is conductively connected to the sonotrode, in particular in the region of an oscillation node, and another part is galvanically isolated from this part. In the context of the invention, it is then possible to arrange the signal terminal on the part of the bracket that is conductively connected to the sonotrode instead of on the sonotrode. In this way, too, the sealing surface of the sonotrode can be subjected to the signal voltage. When the signal terminal is placed on the sonotrode, it affects the oscillation behaviour of the oscillating stack. This is not the case with the bracket, for which reason the arrangement of the signal terminal on the bracket is particularly advantageous.

The converter member preferably comprises a converter housing in which the at least one piezoelement is arranged.

Advantageously, the ultrasonic tool comprises a protective conductor, which is preferably arranged on the converter housing. The protective conductor is connected or connectable to the ground. The ultrasonic tool then preferably comprises a first portion, a second portion, and a third portion. The first portion comprises at least the neutral conductor. The second portion comprises at least the protective conductor and the converter housing. The third portion comprises the sealing surface of the sonotrode and can output or receive a signal voltage via the signal terminal.

In preferred embodiments, a galvanic isolation of the first portion and the second portion can be omitted due to the invention. The second portion and the third portion are then galvanically isolated. This ensures that the signal voltage does not dissipate via the protective conductor. In these embodiments, an additional grounding of the converter housing by means of the protective conductor is possible due to the invention. In the event of a malfunction of the neutral conductor, a potential is prevented on the converter housing, because all potential is dissipated by the protective conductor. Thus, the additional grounding means that there is no longer a risk of personal injury from contact with the converter housing. There is also no risk that a potential other than the desired potential of the signal voltage is applied at the sealing surface of the sonotrode. In this way, a contact detection is possible despite the additional grounding of the converter housing.

Also, the first portion and the second portion can be galvanically isolated from one another and can most preferably be electrically insulated from one another. The second portion is then galvanically isolated from the first and third portions. The second portion advantageously lies between the first portion and the third portion so that two electrical insulations are present between the neutral conductor (first portion) and the sealing surface of the sonotrode (third portion). In this way, an additional grounded portion is created between the first portion, at which a high voltage can be applied in the event of a fault, and the third portion, at which the signal voltage is applied.

An insulation housing made of electrically insulating material defining an insulation space can be provided in the converter housing, wherein the at least one piezoelement and the neutral conductor are arranged in the insulation space. The insulation housing then constitutes the galvanic isolation between the first and second portions. Particularly preferably, the insulation housing is toroidal or cylindrically hollow. In particular, the converter member comprises a shaft, in particular a converter screw with a shaft surrounded by the toroidal or cylindrically hollow insulation housing. The piezoelements are safely galvanically isolated from the rest of the converter member, in particular the converter screw, by means of which the piezoelements are strained. The insulation housing can consist of several insulation parts, in particular axially arranged insulation washers and radially insulating, cylindrical insulation parts. In this way, the piezoelements can continue to be compressed in the axial direction, thereby ensuring transfer of the ultrasonic oscillation. The insulation housing serves in particular a basic insulation of the converter.

Advantageously, a counter tool is provided with a sealing surface, which is positioned such that the workpiece to be machined can be arranged between the sealing surface of the sonotrode and the sealing surface of the counter tool during machining. The sealing surface of the counter tool is preferably grounded. By applying the signal voltage, a contact between the sealing surfaces of the sonotrode and the counter tool can then be detected as described above. It is also possible in the context of the invention to apply the signal voltage to the counter tool and to instead ground the signal terminal. The counter tool is preferably a roller, in particular a rotating roller, that conveys the workpiece during machining. In this way, a continuous welding of the workpiece is enabled. The counter tool is at least partially electrically conductive.

The sonotrode or oscillating stack in total is preferably movable along an adjustment direction, in particular by means of an adjustment device of the ultrasonic tool. The adjustment device can be part of the bracket. In this way, the sonotrode can be moved towards and away from the counter tool. In this way, the distance between the sonotrode and the counter tool can be adjusted at any time. Also, during machining, the sonotrode or oscillating stack as a whole can be moved gradually towards the counter tool, in particular in case the machining consists of a separating operation.

In advantageous further developments, a voltage source is provided, with which the third portion, in particular the signal terminal, can be subjected to a signal voltage, wherein a sensor is provided for detecting an electrical voltage applied to the third portion or an electrical voltage dissipated from the third portion. If an electrical voltage is applied to or dissipated from the third portion, this is detected by the sensor. From this detection, a contact between the sealing surfaces can be made.

The AC voltage applied to the at least one piezoelement is preferably between 500 $V_{rms}$ (root mean square, effective voltage) and 3000 $V_{rms}$, and preferably has a frequency of between 20 kHz and 70 kHz. It has been shown that low voltages are advantageous for the signal voltage. The distances between the sealing surfaces during processing and the contact times are very low due to the high frequencies and the piezo technique. If the signal voltage is too high, voltage flashes (electric arcs) will occur even before actual contacting between the sealing surfaces, whereby the sensor detects a current flow. If the voltage is too low, on the other hand, even in case of a minor contact, hardly any current flows, which makes early detection of the contacts difficult. The signal voltage is preferably a DC voltage and further preferably less than 30 V, preferably less than 25 V, and most preferably between 5 V and 12 V. The inventors have found that the range of 5 V of 12 V is most suitable for contact detection, wherein voltages up to 25 V also lead to acceptable results. Above 30 V, on the other hand, voltage flashes occur far too early in some applications. The signal voltage can also be an AC voltage, wherein a DC voltage is preferable, because, in case of contact, it results in a uniform discharge, which can be well detected.

If the sealing surfaces are contacted, a current flows between the sealing surfaces. If the contact ends, the voltage source of the signal voltage builds up a potential. Because the distances between the individual contacts can be very small, this build-up is to be carried out extremely quickly. For this purpose, it has been proven advantageous when the electrical line with which the signal voltage is applied is shielded and/or does not exceed a predetermined total capacity. The third portion is therefore preferably connected to the voltage source by means of an electrical line, which is shielded and/or whose total capacity is <2500 pF, in particular <1500 pF. If the total capacity is <1500 pF, contacts that occur very briefly in succession can also be detected and differentiated. At up to 2500 pF, sufficient contacts can still be detected, whereas detection at over 2500 pF suffers substantially.

In advantageous further developments, it is provided that an insulation resistance between the second portion and the third portion is at least 5 kΩ, in particular at least 7 kΩ. In principle, the greater the insulation resistance, the better the galvanic isolation. However, in some cases, a very large insulation resistance can only be realized with considerable effort. A limit of 100 MΩ can therefore be considered as the upper limit for the insulation resistance, wherein any greater value is also acceptable, as long as no further boundary conditions oppose it.

An amplitude booster is preferably provided between the converter member and the sonotrode. The converter member is mechanically coupled to the amplitude booster and the amplitude booster is mechanically coupled to the sonotrode. The sonotrode, amplitude booster, and converter member are tuned to one another such that the sonotrode can be set into resonance oscillation with the mechanical ultrasonic oscillation of the wavelength λ. The sonotrode, the amplitude booster, and the converter member form the oscillating stack.

The sonotrode, amplitude booster and converter member can also be referred to as components that are interconnected.

In advantageous further developments, at least one insulating means is provided, which causes the sealing surface of the sonotrode and the neutral conductor to be galvanically isolated, in particular electrically insulated. Various configuration options of the at least one insulating means are described below.

Particularly preferably, at least one insulating means is provided at exactly two positions, namely on the one hand at a direct contact point between two affected components, i.e. components to be connected, i.e. where the ultrasonic oscillation is transferred from one component to the respective successive component in the propagation direction, and on the other hand at a connection point where the components are held together, which can occur in particular by a form-fit and materially-locking connection. Several connection points can also cooperate in order to hold the components together. Compressive forces are in particular transferred at the contact point and tensile forces in particular at the connection point.

The converter member and the sonotrode and/or the converter member and the amplitude booster and/or the amplitude booster and the sonotrode are preferably connected to one another via at least one connecting element. The connecting element in particular causes a force fit along the propagation direction. As a result, the respective components are connected to one another such that the ultrasonic oscillation can propagate along the length of the ultrasonic tool. Preferably, the connecting element is a screw and/or a threaded bolt and/or a threaded bushing. The at least one connecting element connects the respective components in particular with a clamping force of at least 20 kN, and preferably less than 150 kN, in particular at least 30 kN and/or less than 90 kN. With these clamping forces, it is ensured that the components are connected to one another so that the ultrasonic oscillation can spread evenly. The connecting element is preferably configured as an insulating means and is at least partially provided with an insulating coating and/or at least partially consists of an insulating material. In this way, galvanic isolation is carried out where the force fit between the respective components is closed. The threaded bushing can also be a wire threaded insert.

Preferably, at least one insulating element, in particular an insulating washer, is provided between the converter member and the sonotrode, in particular between the converter member and the amplitude booster and/or between the amplitude booster and the sonotrode, which insulating element is at least partially configured as an insulating means and consists at least partially of an insulating material and/or is at least partially provided with an insulating coating. The insulating washer preferably comprises a bore, through which, for example, the connecting element can project, i.e. preferably is embodied as a ring washer. The insulating element in particular causes a galvanic isolation at a contact point between the affected components, where the ultrasonic oscillation is transferred to the respective successor component in the propagation direction. Particularly preferably, the connecting element and the insulation element are therefore used in combination.

In advantageous further developments, the converter member and/or the amplitude booster and/or the sonotrode is configured as an insulating means and at least partially consists of an insulating material and/or is at least partially provided with an insulating coating. In this way, galvanic isolation by the connecting element and/or the insulation element can be omitted. The respective affected component is then coated or consists of an insulating material at the contact point where the ultrasonic oscillation is transferred and/or where a friction is generated. In this way, the number of components used can be reduced, which is particularly advantageous for ultrasonic tools, as additional components alter the oscillation behaviour of the entire oscillating stack. The use of a coating has the particular advantage that it can be designed thinly enough that the oscillation behaviour of the oscillating stack changes little or only slightly. If a component, for example an insulating washer made of an insulating material, is used, the component must generally have a thickness that is substantially larger than a coating. The component then affects the oscillation behaviour of the oscillating stack substantially more strongly. This is particularly true for the contact point between two components.

The coating of threads with an insulating coating is possible but is often difficult due to the partially filigree thread contour. In advantageous further developments, a cascade of several components is provided as the connecting element, wherein a first cascade part is preferably held by a second cascade part in the propagation direction by means of a form fit and the first cascade part and/or the second cascade part is provided with an insulating coating on the respective contact surface for the form fit. Alternatively, at least one of the cascade parts can consist of an insulating material. An essential advantage of the cascade is that not threaded portions but rather only the contact surface(s) need to be coated. Depending on the design of the cascade, the insulating means at the contact point can also be realized by the cascade, or an insulating element, in particular an insulating washer, is used in addition to the cascade.

In advantageous further developments, the connecting element comprises a smooth, in particular cylindrical, portion, which is provided with an insulating coating, wherein this portion is shrunk into the sonotrode or converter member or amplitude booster. The sonotrode can be heated, for example, thereby widening a bore provided therein, whereupon the smooth portion can be inserted into the bore. When cooled, the bore shrinks again and then holds the connecting element in a frictionally-locking manner. Smooth means in particular that the portion has a consistent cross-section along its axial extension and in particular does not have any thread. The cross-section can be round, but also star-shaped or otherwise configured. Round has the advantage that the geometry is easier to manufacture, for example by grinding. In the shrinking, very narrow tolerances are to be maintained in order to achieve a sufficiently large force fit, but at the same time not overload the base material with too large a voltage. Also in these embodiments, the substantial advantage is that no threaded portions need be coated. Alternatively or additionally, the connecting element can comprise a smooth portion and a threaded attachment that is shrunk onto the smooth portion. The threaded attachment then provides an outer thread, which can be screwed into a bore having inner threads of another component.

In advantageous further developments, a through-bore is provided in the amplitude booster, wherein the amplitude booster comprises a portion provided with an insulating coating. Alternatively, a part of the converter member, in particular a converter lower part, can also comprise the through-bore and the portion with the insulating coating. In these embodiments, there is further provided a screw that rests with its head on the coated portion and is spaced apart from an inner surface of the through-bore. With the amplitude booster with the through-bore, the screw can be screwed with its thread into the converter member or the sonotrode, and with the converter lower part with the through-bore, the screw can be screwed with its thread into the amplitude booster or the sonotrode. Also in these embodiments, a threaded portion having a coating need not be provided. The screw can be a countersunk screw resulting in automatic centring of the interconnected components.

Additional insulating means can be provided on an inner wall of the through-bore in order to still ensure sufficient insulation in the event of an unplanned contact. No major specifications are placed on these insulating means, as they do not need to transfer large forces but need only ensure the electrical resistance. These insulating means can therefore be insulating sleeves, spray paint, or insulating films, for example.

In advantageous further developments, a transverse bore that runs transverse to the propagation direction is provided in the converter member or the amplitude booster or the sonotrode, in which an at least partially coated transverse part is inserted with a threaded bore. The transverse part can be a cuboid groove piece or a bolt. In addition to the transverse bore, the converter member, the amplitude booster, or the sonotrode then comprises a bore concentric to the threaded bore, in which a screw or a threaded bolt is arranged, wherein the screw or the threaded bolt is connected to the transverse part by means of the threaded bore. The screw or threaded bolt can then be connected to an adjacent part, i.e. in the case of the sonotrode with the amplitude booster or the converter member, in the case of the amplitude booster with the converter member or the sonotrode, and in the case of the converter member the amplitude booster or the sonotrode. Again, no thread needs to be coated for the force-fit connection. However, an insulating element, in particular an isolating washer, or an insulating coating, is additionally required at the contact point between the components.

In advantageous further developments, a coupling piece, in particular a flange part, is provided as an insulating means, which is at least partially coated. The coupling piece is fastened to one of the components by means of screws, wherein the coupling piece is provided with the insulating coating where the screws rest. Again, no thread needs to be coated for the force-fit connection.

In case of an ultrasonic tool, high forces and ultrasonic oscillation must be transferred via the insulating coating or insulating material. The inventors have found that not all electrically insulating materials are suitable for galvanic isolation in ultrasonic tools by far. Preferably, the insulating coating and/or material comprises at least one of the following components: ceramic, in particular chromium oxide ($Cr_2O_3$) and/or aluminium oxide ($Al_2O_3$), glass, polymer composites, in particular glass reinforced plastic (GRP), and/or carbon reinforced plastic (CRP). These materials have proven particularly advantageous in terms of both galvanic isolation and force and ultrasonic oscillation transfer.

When selecting the thickness of the coating, it should be noted that the coating can have an influence on the entire oscillating stack, depending on the thickness. At the contact point between the affected components, the coating alters the propagation/transfer of the ultrasonic oscillation. If the insulating coating is applied to a threaded portion, it changes the degree of the thread, which must already be taken into account in the original manufacture of the thread. Preferably, the insulating coating has a thickness of at least 0.02 mm. Further preferably, the thickness is at most 0.5 mm. It has been shown that coatings below 0.02 mm can have a sufficient insulating effect. However, in particular in the region of the threads, the insulation can be damaged by screwing in the corresponding counterpart (for example, a screw). If the coating is configured too thinly, there is a risk of a voltage flash in the event of such damage, so that the insulation effect is reduced or completely lost. Thicknesses of >0.5 mm are simply not necessary from the perspective of the insulating effect. In the range of threads of the usual sizes, such a thick coating also results in the threads being practically levelled down, which interferes with the connecting process.

In advantageous further developments, the connecting element is a bolt having two outer thread portions adjacent in the axial direction, wherein each outer thread portion is provided with an outer thread, wherein the outer threads are isolated from one another and wherein at least one of the outer thread portions, in particular exactly one of the outer thread portions, is coated with an insulating material. The connecting element configured in this way thus comprises two threaded portions arranged axially one after the other with a respective outer thread, wherein the outer threads do not merge into one another. If the connecting element is screwed into one of the components with the one threaded portion, the screwing operation is possible at most up to the starting point of the second threaded portion. There, the inner thread present in the component does not match the thread of the second thread section, for which reason further screwing is prevented. In these further developments, only one of the threaded portions needs to be coated, which substantially lowers the cost of coating. Nevertheless, with regard to the force-fit connection between the two components, a galvanic isolation between the components is realized by the connecting element designed in this way. In particularly advantageous further developments, a projection is provided between the threaded sections, in particular a circumferential, radially projecting bead, which impedes further screwing beyond the projection. This projection is preferably also coated, as it can come into contact with the non-coated counterpart.

In advantageous further developments, the connecting element is a screw or a threaded bolt with an additional ring washer, wherein the screw or the threaded bolt and the ring washer are either configured as a one-piece or multi-piece unit, wherein the screw or the threaded bolt and the ring washer are each configured as insulating means and consist at least partially of an insulating material and/or are at least partially coated with an insulating material. The screw or threaded bolt then cause a galvanic isolation with respect to the force fit between the two components involved and the ring washer causes the galvanic separation with respect to the contact surface between the two components. These embodiments are comparatively straightforward to implement and in particular do not require any adaptation of already existing components (sonotrode, amplitude booster, converter member). The one-piece design makes the insulating component complex but facilitates assembly of the components. Likewise, the ring washer must have a certain base thickness in a one-piece design, which can adversely affect the oscillating behaviour.

In advantageous further developments, the connecting element is an element that engages with an outer peripheral surface, in particular a union nut. The particular advantage of a union nut is that it is visible from the outside and, for example, damage to the coating or the union nut itself can be more easily detected.

The various connecting elements described are generally combinable with one another.

In advantageous further developments, the converter member and the sonotrode and/or the converter member and the amplitude booster and/or the amplitude booster and the sonotrode are connected to one another via an insulating adhesive, in particular polyurethane and/or epoxy resin, wherein the connecting element is connected in particular to the converter member and/or the sonotrode and/or the amplitude booster via an insulating adhesive. The use of an adhesive offers the advantage that, in a working step, both the galvanic separation and the connection between the components can be realized. While it is generally conceivable that the adhesive can be employed at the contact point between the two components to be connected, the preferred field of application of the insulating adhesive is to connect a connecting element, for example a screw or a threaded bolt, to one of the two components so that this component can then be screwed into a second component.

Preferably, the ultrasonic tool comprises a control unit, in particular configured so as to carry out the contact detection. The control unit is preferably connected to the adjustment device and the sensor for detecting electrical charge applied to the third portion or electrical charge dissipated from the third portion. The control unit can thereby drive the adjustment device based on the sensor signal and move the sonotrode closer to or away from the counter tool. The control unit can also be connected to the voltage source of the signal voltage, the voltage source of the AC voltage, further sensors and/or output devices, for example a display or a signal lamp. Thus, the voltage sources can also be controlled as a function of the sensor signal, for example to reduce the amplitude of the AC voltage if too many or too long contacts are detected, or to switch off the AC voltage entirely. An output device allows for a person to noticeably output the sensor signal, for example as a warning in case of too many contacts or as a listing of all detected contacts.

The problem of the invention is also solved by a method for machining a workpiece by means of mechanical ultrasonic oscillations by means of an ultrasonic tool according to the above description. The method is characterized in that the workpiece is arranged for machining between the sonotrode and a counter tool, and the workpiece is machined by means of the ultrasonic tool, on a signal terminal of the sonotrode electrically connected to the sealing surface of the sonotrode, an electrical signal voltage, in particular a signal voltage less than 100 V, preferably less than 30 V, and most preferably between 5 V and 25 V, is created wherein an electrical current flow between the neutral conductor and the signal terminal is prevented, and it is at least temporarily determined whether a current flows between the sonotrode and the counter tool and/or a voltage drops between the sonotrode and the counter tool. By applying the signal voltage and determining whether a current flows and/or a voltage drops, it can be determined whether contacts occur between the sonotrode and the counter tool. Due to the galvanic isolation in the ultrasonic tool, it is prevented that the signal voltage is dissipated via the neutral conductor so that the contact detection is not impaired. In the event of a fault, there is also no risk that a high potential generated by the piezoelements abuts the sonotrode and/or the counter tool.

During machining, a force is preferably applied to the sonotrode, which is transferred from the sonotrode to the workpiece. This force ensures an even transfer of the ultrasonic oscillation to the workpiece.

The AC voltage (effective voltage) applied to the converter of the ultrasonic tool is preferably between 500 $V_{rms}$ and 3000 $V_{rms}$ and preferably has a frequency between 20 kHz and 70 kHz. With these voltages and frequencies, generating an ultrasonic oscillation for machining the workpiece is effectively possible.

The ultrasonic oscillation on the sealing surface of the sonotrode preferably has a frequency of 20 kHz to 70 kHz and/or an amplitude of 5 μm to 50 μm. The frequency of the ultrasonic oscillation corresponds to the frequency of the AC voltage. The amplitude is substantially influenced by the amount of the AC voltage, the constructive configuration of the converter member, the amplitude booster, and the sonotrode, as well as the converter, i.e. the at least one piezoelement itself. Contact detection is particularly suitable for amplitudes from 5 μm to 50 μm.

Preferably, the workpiece comprises at least partially a polymer, in particular a thermoplastic polymer. Preferably, the workpiece consists entirely of a polymer in the region of a contact surface with the sonotrode. The workpiece is preferably melted at least partially during machining in the region of a contact surface with the sonotrode by the ultrasonic oscillation. For contact detection, it is of particular advantage when the workpiece comprises a polymer, in particular in the region of the contact surface with the sonotrode. In particularly advantageous embodiments, the workpiece consists of several parts, in particular several webs of material, which are joined by the machining. The webs of material are preferably conveyed continuously through the region between the sonotrode and counter tool, in particular by means of rollers. The contact detection according to the invention is particularly advantageous in case of such thin components, because contacts between the sonotrode and counter tool often occur due to the small thicknesses. Each contact affects the life of the sonotrode and counter tool. Thus, an exact adjustment of the gap between the sonotrode and counter tool is particularly advantageous. This setting can be achieved by the method according to the invention.

In advantageous further developments, a duration is determined for at least one current flow and/or voltage drop between the sonotrode and counter tool and, if the duration exceeds a predefined time limit, the current flow and/or voltage drop is evaluated as a contact between the sealing surfaces of the sonotrode and the counter tool with a contact time that corresponds to the duration of the current flow or voltage drop. The time limit is in particular >0.01 μs, and particularly preferably ≥1 μs. An upper limit of 1000 μs for the time limit can be set to rule out incidents. It has been shown that a current flows not only when the sonotrode and counter tool actually contact, but also when the sonotrode and counter tool come very close to one another or partially contact one another. Because the sealing surface of the sonotrode oscillates with the frequency of the ultrasonic oscillation and moves back and forth, there is a flash-over of the voltage between the sonotrode and counter tool and consequently a flow of current, in particular in the one extreme position in which the distance between the sealing surfaces is minimal. It has therefore been shown that it is advantageous not to evaluate every current flow as a contact between the sonotrode and counter tool, but only current flows/voltage drops that last for a certain period of time, e.g. ≥1 μs. Preferably, current flows and/or voltage drops whose duration falls below the predefined time limit are therefore discarded and not considered as a contact. The stated ranges for the time limit have proven to be particularly advantageous for the frequencies of ultrasonic oscillation indicated above. Above 1000 μs, it can no longer be assumed that it is a single contact.

In advantageous further developments, a current strength is determined for at least one current flow and/or voltage drop between the sonotrode and the counter tool, and if the current exceeds a predefined current limit, the current flow and/or voltage drop is evaluated as a contact between the sealing surfaces. The current limit is preferably >1 mA. An upper limit of 300 μs for the current limit can be established in order to rule out incidents. The current intensity is also an indicator of how close the sealing surfaces actually come. Therefore, a differentiation between contacts to be evaluated and non-contacts can also be made based on the current. The sealing surfaces also have a flat extension and—albeit low—roughness. It can therefore be that even small regions of the sealing surfaces already have contact and thus lead to a current flow, but these are so low that this should not yet be considered a contact. Both limit values are also suitable in these cases for evaluating the contacts qualitatively. The determination of the current and the dependent contact evaluation can be used as an alternative or in addition to the duration of the current flow and/or voltage drop. Particularly preferably, a current flow and/or voltage drop is only evaluated as a contact if both the time limit and the current limit are exceeded.

In advantageous further developments, at least one of the following parameters is determined for at least a predetermined (elapsed) period of time, in particular for the most recently elapsed millisecond, wherein the parameter is preferably stored and/or output:
  total number of contacts between the sonotrode and counter tool
  longest contact time of all contacts
  sum of contact times of all contacts The determination of these parameters serves the evaluation of the contact detection. If, for example, a small number of contacts occurs during the specified period or if the overall contact time is very low despite a high number of contacts, it can be concluded that the sealing surfaces have not yet come very close. A threshold value can be provided for each of the parameters, above which a particular action, for example an alert signal, takes place.

The parameters can be further machined by a control unit of the ultrasonic tool. In particular, depending on one or more of the parameters, the position of the ultrasonic tool or the oscillating stack, in particular the sonotrode, is adjusted, a force applied to the sonotrode is reduced or increased, an alert is output, and/or the machining operation is stopped.

The invention is exemplified and explained below with reference to the drawings. Here:

FIG. 1 schematically, shows a first embodiment of an ultrasonic tool in a lateral cross-section;

FIGS. 2 to 16 schematically shows further embodiments of ultrasonic tools

The ultrasonic tool 100 shown in FIG. 1 comprises a converter member 10 and a sonotrode 40. The converter member 10 comprises a converter 20, a converter lower part 12, a ring washer-shaped cover plate 16, and a converter screw 18. The converter 20 comprises four ring washer-shaped piezoelements 22, which are arranged one behind the other between the converter lower part 12 and the cover plate 16. The converter 20 further comprises a total of five electrodes, also referred to as contact washers: three neutral electrodes 24 and two phase electrodes 26, which are also ring washer-shaped. The electrodes 24, 26 are arranged alternately with the piezoelements 22 along a converter axis K between the converter lower part 12 and the cover plate 16. The electrodes 24, 26 alternate with one another. One neutral electrode 24 is thus arranged at the lowest and the highest.

The converter screw 18 rests on the cover plate 16 with its screw head and runs through all bores of the piezoelements 22, the electrodes 24, 26 and the cover plate 16. The converter screw 18 is screwed into the converter lower part 12 and ensures that the piezoelements 22 and the electrodes 24, 26 are kept compact. Unlike in the schematic representation of FIG. 1, the piezoelements and the electrodes 24, 26 are thus in direct contact with one another and are kept compact by the converter screw 18. The converter screw 18 is tightened with a sufficient pre-tensioning force, for example 70 kN.

The converter member 10 further comprises a phase conductor 31 for an electric AC voltage and a neutral conductor 33 for its dissipation. The phase conductor 31 and the neutral conductor 33 form the two poles for the converter 20. The neutral electrodes 24 are connected to the neutral conductor 33 and the phase electrodes 26 are connected to the phase conductor 31. The piezoelements 22 are polarized and respectively arranged to be either all elongated or all clinched at any given time, except for a zero position.

If an electric AC voltage is applied to the phase conductor 31 and the neutral conductor 33, the piezoelements 22 convert the electric AC voltage into an mechanical ultrasonic oscillation, wherein the converter member 10 is set into a resonance oscillation with a mechanical ultrasonic oscillation of the wavelength $\lambda$. The ultrasonic oscillation extends in particular along a propagation direction R, which, in the embodiment shown, runs from the converter 20 to the sonotrode 40, i.e. downwards along the converter axis K. In the embodiment shown, the converter member 10 and the sonotrode both have a length of $\lambda/2$ each along the propagation direction R. Thus, the sonotrode 40 and the converter member 10 are tuned to one another such that the sonotrode 40 is set into a resonance oscillation with the mechanical ultrasonic oscillation of the wavelength $\lambda$.

The sonotrode 40 has a sealing surface 42, which is provided for contacting a workpiece 200 to be machined. The workpiece 200 is shown schematically here. Often, the workpiece 200 comprises several parts that are welded together, in particular several webs of material are welded together, which then together form the workpiece 200.

The ultrasonic tool 100 further includes a counter tool 110 having a sealing surface 111. The ultrasonic tool 100 is configured so as to machine the workpiece 200 by mechanical ultrasonic oscillation. The workpiece 200 is placed between the sealing surfaces 42, 111 for machining or is guided through the gap between the sealing surfaces 42, 111, wherein the workpiece 200 in any case touches the sealing surfaces 42, 111. A force in the propagation direction R is also applied to the workpiece 200, which can be generated by an adjustment device (not shown) of a bracket. If an ultrasonic oscillation is now generated, the workpiece 200 is machined, wherein often several parts, such as webs of material, are connected to one another.

Insulating means 300 are arranged between the converter member 10 and the sonotrode 40. The insulating means 300 comprise a threaded bolt-shaped connecting element 310 and an insulating element 350 in the form of an insulating washer-shaped portion. The connecting element 310 and the insulating element 350 are arranged integrally. In the embodiment shown, the insulating means 300 consist entirely of a ceramic material. The insulating means 300 are screwed with the connecting element 310 into both the converter lower part 12 and the sonotrode 40. The converter lower part 12 and the sonotrode 40 do not contact one another, because they are isolated from one another by the insulating means 300. In this way, the sealing surface 42 of the sonotrode 40 and the first neutral conductor 33 of the converter 20 are galvanically isolated. A current flow between the converter lower part 12 and the sonotrode 40 is prevented.

The converter member 10 comprises a converter housing 11, shown schematically, which in particular shields the piezoelements 22 and the electrodes 24, 26 outwardly. A protective conductor 35 connected to the ground is provided on the converter housing 11. The converter housing 11 is connected to the converter lower part 12 in the region of an oscillation node.

The sonotrode 40 comprises a signal terminal 44 electrically connected to the sealing surface 42 for an electrical signal voltage. The neutral conductor 33 and signal terminal 44 are galvanically isolated from one another by the insulating means 300.

The ultrasonic tool 100 comprises a voltage source 400 that is a DC voltage source. On the one hand, the voltage source 400 is electrically connected via a sensor 410 in the form of a current measuring device to the signal terminal 44 of the sonotrode 40 and on the other hand to the counter tool 110. When used as intended, a DC voltage is applied to the signal terminal 44 and thus to the sealing surface 42 by the voltage source 400. If the sealing surfaces 42, 111 are touched during the machining of the workpiece 200, a current flows. This current flow can be detected by means of the sensor 410. The sonotrode 40 and the counter tool 110 are configured in a conductive manner and in particular consist of a metallic material. From the signal of the sensor 410, a contact between the sealing surfaces 42, 111 can thus be made (contact detection).

An AC voltage source 39 is provided for the generation of the AC voltage of the converter 20, which is connected to the phase conductor 31 and the neutral conductor 33.

If the line from the AC voltage source 39 to the neutral conductor 33 breaks, it can happen that the piezoelements 22 are further stimulated, whereby they then generate a potential on the neutral electrodes 24 and thus the neutral conductor 33. This potential is then also applied to the converter lower part 12. The protective conductor 35 ensures that the potential is dissipated in this fault event and that touching the converter housing 11 does not lead to an injury. The insulating means 300 also prevents this potential in a fault event from abutting the sealing surface 42 of the sonotrode and influencing the contact detection. Conversely, the protective conductor 35 is galvanically isolated from the sealing surface 42 and the signal terminal 44 by the insulating means 300 in order to prevent the signal voltage from being dissipated via the protective conductor 35.

In other embodiments, the insulating means 300 can also be composed of a non-ceramic, for example metallic, material. In these embodiments, the insulating means 300 is then provided with an insulating coating on at least one side or on the entire surface.

In other embodiments, an amplitude booster 60 can also be provided between the converter lower part 12 and the sonotrode 40. The insulating means 300 can then be arranged between the converter lower part 12 and the amplitude booster 60 or between the amplitude booster 60 and the sonotrode 40.

Figure 2:
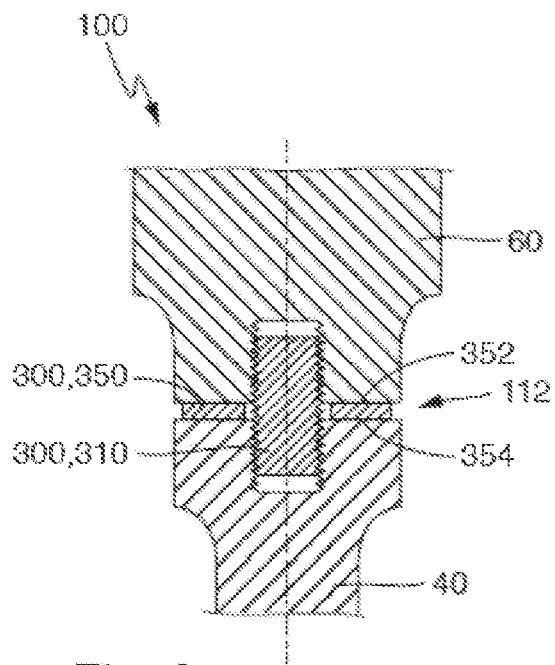

In FIG. 2, only an excerpt of an ultrasonic tool 100 is shown, namely the region around a contact point 112 between the sonotrode 40 and an amplitude booster 60.

In this embodiment, two insulating means 300 are provided between the sonotrode 40 and the amplitude booster 60. A connecting element in the form of a threaded bolt is provided, which is screwed into both the sonotrode 40 and the amplitude booster 60. The threaded bolt is fully coated and connects the sonotrode 40 and the amplitude booster 60 to one another in a force-fit manner, thus constituting the connection point between the components. In this way, the connecting element is configured as an insulating means 300. As a further insulating means 300, an insulating element 350 in the form of an insulating washer is further provided. The insulating washer is a ring washer and is arranged at the contact point 112 between the sonotrode 40 and amplitude booster 60. The insulating washer is also provided with an insulating coating, wherein the insulating coating can be fully present or only on one of the axial sides, for example on the top surface 352 or the bottom surface 354. Together, the connecting element 310 and the insulating element 350 ensure a galvanic isolation of the sonotrode 40 and the amplitude booster 60.

The insulating means 300 shown in FIG. 2 can also be used in other embodiments for a connection of the sonotrode 40 and the converter member 10 or for a connection between the amplitude booster 60 and the converter member 10.

Figure 3:
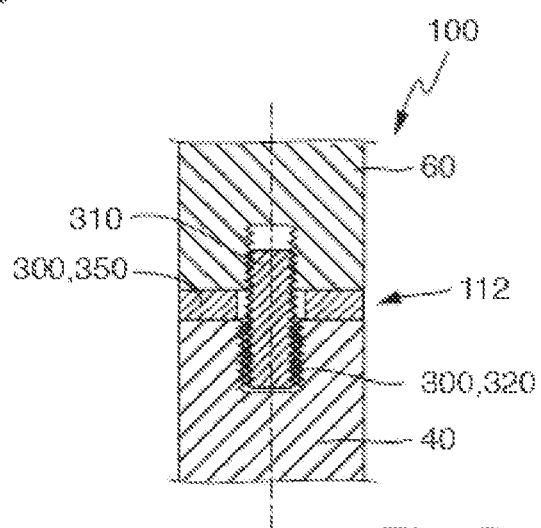

In FIG. 3, an excerpt of an ultrasonic tool 100 around a contact point 112 between the sonotrode and the amplitude booster 60 is shown. In this embodiment, the ultrasonic tool 100 comprises an insulating element 350 in the form of a ring washer-shaped insulating washer, as well as a wire threaded insert 320 as the insulating means 300. The wire threaded insert 320 can consist entirely of an insulating material or can be provided with an insulating coating. The wire threaded insert 320 is screwed into a threaded bore of the sonotrode 40. The same is true for the insulating element 350. A connecting element 310 in the form of a threaded bolt is further provided. The threaded bolt is screwed into the amplitude booster 60 at one end and into the wire threaded insert 320 at the other end. Together, the insulating element 350 and the wire threaded insert 320 constitute a galvanic separation between the sonotrode 40 and the amplitude booster 60.

This type of connection can also be employed in other embodiments between the sonotrode 40 and the converter member 10 or between the amplitude booster 60 and the converter member 10.

Figure 4:
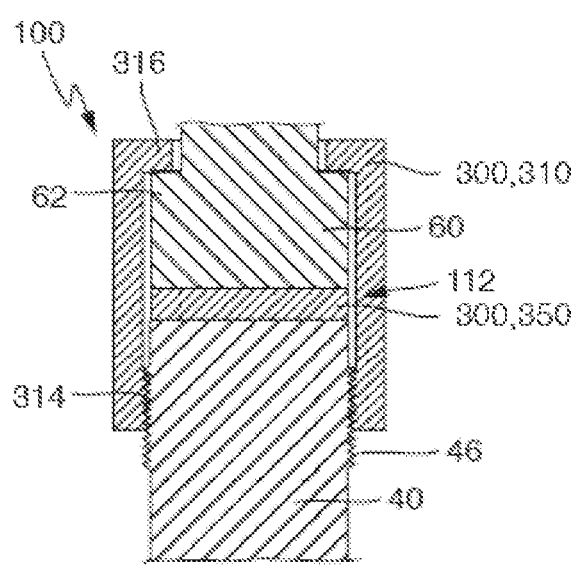

In FIG. 4, an ultrasonic tool 100 is shown in detail around a contact point 112 between the sonotrode and the amplitude booster 60. Both the sonotrode 40 and the amplitude booster 60 do not have a bore in this embodiment. Between the components 40, 60, an insulating element 350 in the form of an insulating washer without a bore is provided as an insulating means 300. In other embodiments, the insulating washer can also have a bore here, for example if it is advantageous with regard to the oscillating technology or a uniform transfer of power. The insulating element 350 constitutes a galvanic isolation at the contact point 112. The sonotrode 40 has an outer thread 46 and the amplitude booster 60 has an circumferential shoulder 62. A connecting element 310 in the form of a union nut is further provided. The union nut has a radially inward projection 316 at its top end and an inner thread 314 at its bottom end. The union nut, when used as intended, rests on the shoulder 62 with the projection 316, and the inner thread 314 is screwed onto the outer thread 46 and thereby connects the sonotrode 40 and the amplitude booster 60 to the connection point in a force-fit manner. The union nut can be made entirely of an insulating material. However, it can also be provided with an insulating coating in individual regions, in particular in the region of the projection 316, preferably wherever it rests on the shoulder 62. As a result, no current can flow from the amplitude booster 60 through the union nut towards the sonotrode 40. The union nut and insulating washer thus form two insulating means 300.

This type of galvanic isolation can also be employed in other embodiments between the sonotrode and the converter member 10 or between the amplitude booster 60 and the converter member 10.

Figure 5:
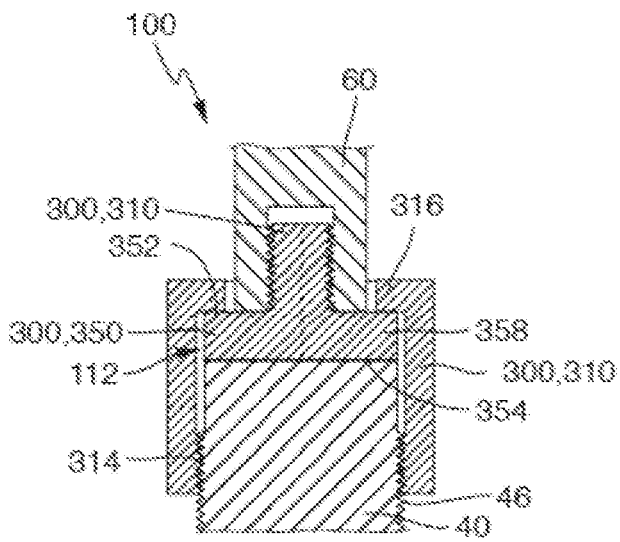

The ultrasonic tool 100 shown in FIG. 5 also includes a sonotrode 40 and an amplitude booster 60. An insulating means 300 in the form of a flange part is provided between the two components 40, 60 at the contact point 112, which comprises a ring washer as the insulating element 350 and a threaded bolt connected thereto as the connecting element 310. The connecting element 310 and the insulating element 350 are configured integrally. In the embodiment shown, the bottom surface 354 of the insulating washer is provided with an insulating coating. In other embodiments, the entire flange part can consist of an insulating material, for example ceramic.

The insulating washer projects radially across from the amplitude booster 60 and forms a flange shoulder 358 there. The flange shoulder 358 is circumferential. A union nut is further provided as an additional connecting element 310. The union nut has a radially inward projection 316 at the upper end and an inner thread 314 at the lower end. The projection 316 rests on the flange shoulder 358 and the thread 314 is screwed onto an outer thread 46 of the sonotrode 40. The insulating washer is also provided with an insulating coating where the union nut rests, i.e. on the top side 352. This is not necessary when the flange part consists entirely of an insulating material.

The flange part is screwed into a threaded bore of the amplitude booster 60 with the threaded bolt. With the insulating coating, the sonotrode 40 and the amplitude booster 60 are galvanically isolated.

This type of connection can also be employed in other embodiments between the sonotrode 40 and the converter member 10 or between the amplitude booster 60 and the converter member 10.

Figure 6:
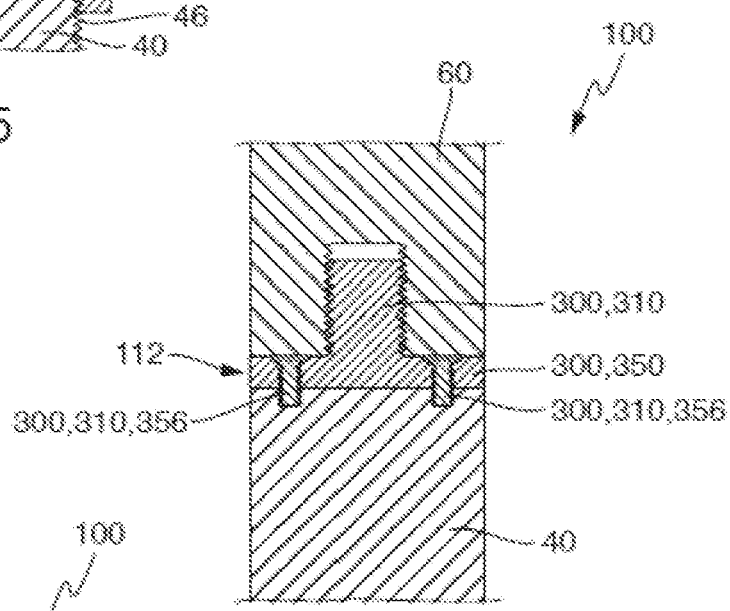

In FIG. 6, a further embodiment of an ultrasonic tool 100 is shown, also here in detail around the contact point 112 between the two components 40, 60. Insulating means 300 are again arranged between the sonotrode 40 and the amplitude booster 60. In this shape, a flange part is provided, which integrally comprises an insulating washer as an insulating element 350 and a threaded bolt as a connecting element 310. The flange part consists of an insulating material, for example ceramic. The insulating means 300 comprises bores arranged along a circular orbit, through which a flange screw 356 respectively runs. The insulating means 300 is connected to the sonotrode 40 with the flange bolts 356. The flange bolts 356 are rotated in threaded bores of the sonotrode for this purpose. The amplitude booster 60 is screwed onto the threaded bolt. The flange bolts 356 are provided with an insulating coating. Thus, the flange bolts 356 also constitute insulating means 300 and connecting means 310. With the insulating coating and insulating material, the sonotrode 40 and amplitude booster 60 are galvanically isolated from one another. In alternative embodiments, the flange part can also be provided with only an insulating coating and/or the flange bolts 356 can be made of an insulating material.

This type of connection and insulation can also be employed in other embodiments between the sonotrode and the converter member 10 or between the amplitude booster 60 and the converter member 10.

Figure 7:
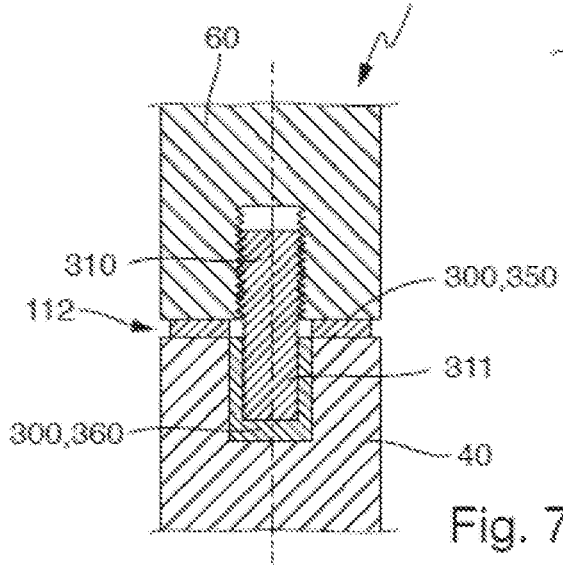

In the embodiment of an ultrasonic tool 100 shown in FIG. 7, an annular insulating washer is provided as the insulating element 350 between the sonotrode 40 and the amplitude booster 60. The insulating washer forms the galvanic isolation at the contact point 112. A threaded bore is provided in the amplitude booster 60. In the sonotrode 40, a blind bore without thread is provided. The two bores are concentric.

The ultrasonic tool 100 further comprises a bolt as a connecting element 310, which is provided with a thread at one end and has a smooth portion 311 at the other end. The bolt is glued to the sonotrode 40 by means of an adhesive 360, i.e. is connected in a material-locking manner. The bolt then projects beyond the upper end of the sonotrode 40. In this way, the amplitude booster 60 can be screwed onto the bolt. The adhesive 360 is insulating and causes galvanic isolation at the connection point between the sonotrode 40 and the amplitude booster 60.

In other embodiments, the bolt can also be provided with a thread on its entire circumferential surface and/or the bore in the sonotrode 40 can be provided with a thread internally, wherein the bores do not fit with one another. If an adhesive 360 is introduced into the resulting intermediate space, an undercut and thus a positive lock is achieved in addition to the material-locking connection.

The type of galvanic isolation described herein between the sonotrode 40 and the amplitude booster 60 can also be used for galvanic isolation between the sonotrode 40 and the converter member 10 or between the amplitude booster 60 and the converter member 10 in other embodiments.

Figure 8:
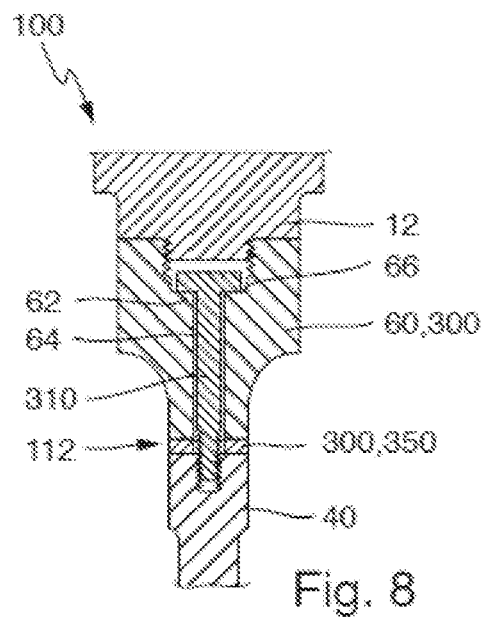

FIG. 8 shows an excerpt of an ultrasonic tool 100 according to a further embodiment. In this embodiment, the amplitude booster 60 comprises a through-bore 64 that terminates at its upper end in a shoulder 62. A screw is arranged in the through-bore 64 as a connecting element 310. The bolt projects downwardly out of the amplitude booster 60 or out of the through-bore 64 and is screwed there into a threaded bore of the sonotrode 40. Additional insulating means (not shown) are provided on an inner wall of the through-bore. With these additional insulating means, an unplanned contact of the through-bore 64 and the screw ensures a sufficient insulation. These additional insulating means do not have to transfer large forces, but rather only ensure the electrical resistance. Even in other embodiments, where no insulating coating is provided between two components but a contact cannot be completely ruled out, these additional insulating means can be used.

An insulating washer is also arranged as an insulating element 350 at the contact point 112 between the sonotrode 40 and the amplitude booster 60. The insulating washer is provided with an insulating coating or is made entirely of an insulating material, for example ceramic, thereby constituting an insulating means 300. An insulating coating is also provided on a shoulder surface 66 of the shoulder 62, i.e. on the surface on which the screw head of the screw rests. Otherwise, the screw will not contact the amplitude booster 60. In this way, the sonotrode 40 and the amplitude booster 60 are galvanically isolated. In this way, the amplitude booster 60 constitutes an insulating means 300.

Above the through-bore 64, the amplitude booster has an inner thread into which the converter lower part 12 is screwed.

Figure 9:
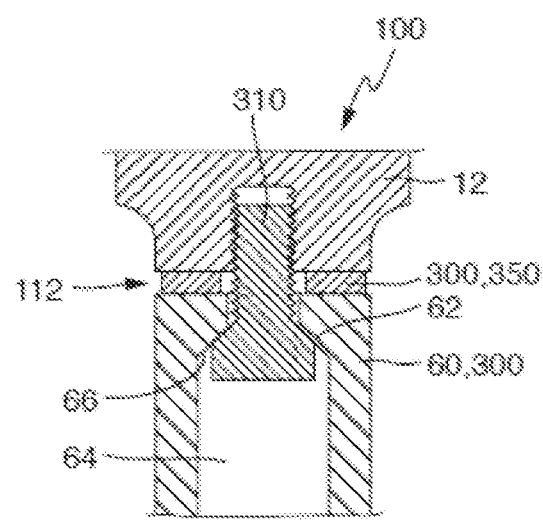

FIG. 9 shows a further embodiment of an ultrasonic tool 100. In this embodiment, the amplitude booster 60 comprises a through-bore 64 that has a conical taper at the top end. A screw can be inserted into the through-bore 64 from below as a connecting element 310 that rests on a shoulder surface 66 of a shoulder 62 of the conical taper. This is the location of the connection point. In this position, the screw projects upwardly out of the through-bore 64 and is screwed there into a threaded bore of the converter lower part 12. Between the converter lower part 12 and the amplitude booster 60, an annular insulating washer is arranged as the insulating element 350. An insulating coating is arranged on the shoulder surface 66 of the shoulder 62. In this way, the amplitude booster 60 constitutes an insulating means 300.

The insulating washer is provided with an insulating coating or is made entirely of an insulating material and thus forms an insulating means 300. In this way, the amplitude booster 60 and the converter lower part 12 are galvanically isolated.

Figure 10:
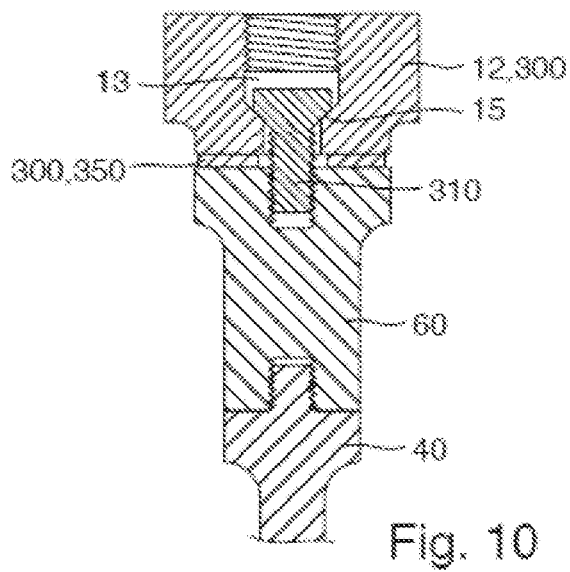

In the embodiment according to FIG. 10, the ultrasonic tool 100 comprises a sonotrode 40, an amplitude booster 60, and a converter lower part 12. The amplitude booster 60 comprises two concentric threaded bores, each having an inner thread. The sonotrode 40 is screwed into the lower bore. The converter lower part 12 comprises a through-bore 13 that is concentric with the upper threaded bore in the amplitude booster. An insulating washer is arranged between the converter lower part 12 and the amplitude booster 60 as an insulating element 350. The insulating washer is made of an insulating material or is provided with an insulating coating, thereby constituting an insulating means 300. A bolt can be inserted into the through-bore 13 from above as a connecting element 310. The screw then abuts one shoulder 15 of the converter lower part 12, wherein the through-bore 13 in the region of the shoulder 15 is provided with an insulating coating. In this way, the converter lower part 12 constitutes an insulating means 300. The screw is threaded into the upper threaded bore of the amplitude booster and connects the amplitude booster 60 to the converter lower part 12 in a force-fit manner. The amplitude booster 60 and the converter lower part 12 are galvanically isolated from the insulating coating and additionally the insulating washer.

An inner thread is provided at the upper end of the through-bore 13, into which the converter screw 18 can be screwed in. In this embodiment, the piezoelements 22 can be supplemented only after the connection of the converter lower part 12 and the amplitude booster 60, and the converter 20 can be constructed entirely.

The amplitude booster and the converter lower part 12 are galvanically isolated by the insulating washer and the coating in the region of the shoulder 15.

Figure 11A:
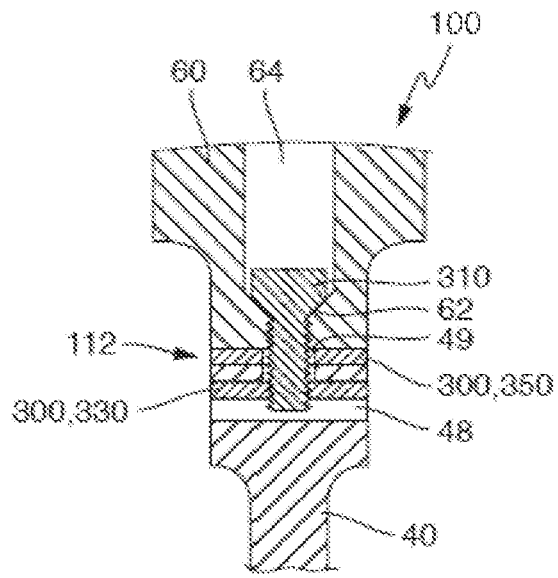
Figure 11B:
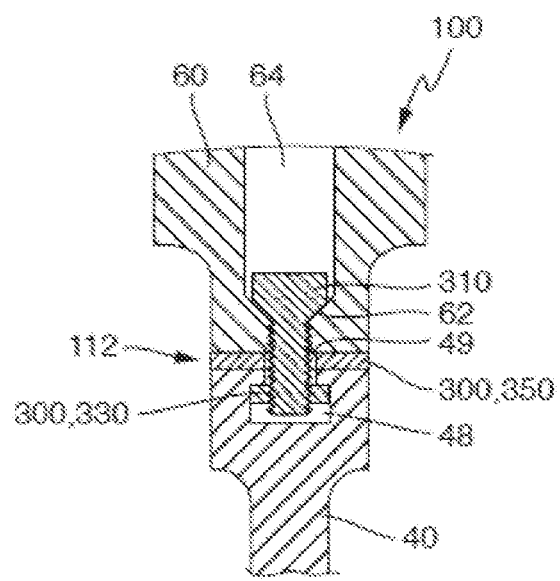
Figure 11C:
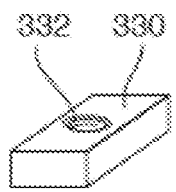

FIGS. 11A, 11B, and 11C show a further embodiment of an ultrasonic tool 100. The region around the contact point 112 between the sonotrode 40 and the amplitude booster 60. The amplitude booster 60 comprises a through-bore 64 that has a shoulder 62 in the lower region. Between the sonotrode 40 and the amplitude booster 60, an insulating washer is arranged as an insulating element 350, which is annular in shape. The insulating washer is made of an insulating material or is provided with an insulating coating, thereby constituting an insulating means 300.

A transverse bore 48 and a central blind bore 49 are provided in the sonotrode 40, wherein the blind bore 49 opens into the transverse bore 48. The transverse bore 48 is rectangular in cross-section and the blind bore 49 is round. A cuboid transverse part 330 in the form of a groove piece can be inserted into the transverse bore 48 from the side. The transverse part 330 has a central threaded bore 332 that is arranged concentrically with the blind hole 49. Subsequently, a screw can be inserted through the through-bore 64 from above, which can lie on the shoulder 62 and can be screwed into the bore 332 of the groove piece. The groove piece is pulled upwards until it abuts the ceiling of the transverse bore 48. If the screw is screwed in further, a clamping force is applied. The transverse part 330 is provided with an insulating coating, wherein the bore is not coated. In this way, the transverse part 330 constitutes an insulating means 300. Because the transverse part 330 abuts with a top side against the top side of the transverse bore 48, a galvanic isolation is created.

In other embodiments, the transverse part 330 can also be cylindrical. If the transverse part 330 is configured cylindrically, the transverse bore 48 is preferably round or oval in cross-section.

A galvanic separation between the sonotrode 40 and the amplitude booster 60 is created by the insulating washer and the transverse part 330.

The embodiment shown can also be used in a connection between the sonotrode and the converter member 10 or between the amplitude booster and the converter member 10.

Alternatively, the transverse part 330 can also consist entirely of an insulating material.

Figure 12:
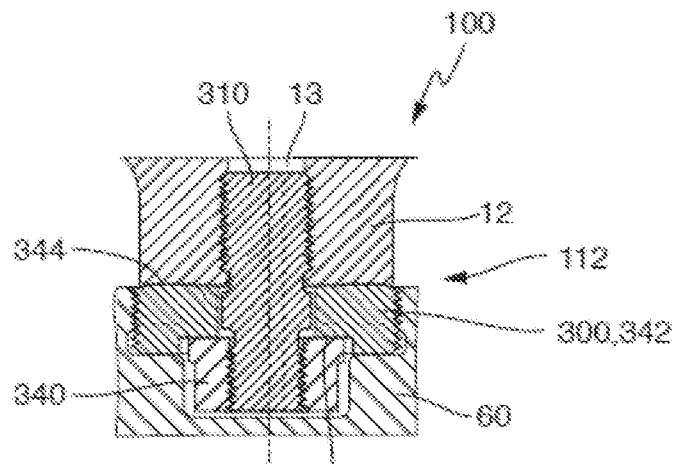

In the embodiment illustrated in FIG. 12, the ultrasonic tool 100 comprises a converter lower part 12 and an amplitude booster 60 that come together at a contact point 112. The converter lower part 12 comprises a through-bore 13. A cascade of several components is provided as the connecting element 310 in this embodiment. The cascade includes a threaded bolt having two isolated threaded portions. With the one threaded portion, the threaded bolt is screwed into an inner thread of the converter lower part 12. The other end of the threaded bolt can be screwed into a first cascade part 340. The first cascade part 340 holds a second cascade part 342 by means of a positive lock in the propagation direction R. The second cascade part 342 has an outer thread by means of which it is connected to an inner thread of the amplitude booster 60. The second cascade part 342 is provided with an insulating coating on a top surface 344 and a bottom surface 346. In this way, the second cascade part 342 constitutes an insulating means 300. With the top surface 344, the second cascade part 342 contacts the converter lower part 12. With the bottom surface 346, the second cascade part 342 contacts the first cascade part 340. The threaded bolt does not touch the second cascade part 342. Here, too, additional insulating means, for example an insulating sleeve, can be provided between the threaded bolt and the second cascade part 342. In this way, the converter lower part 12 and the amplitude booster 60 are galvanically isolated from one another.

Such a cascade can also be employed for a connection between the amplitude booster 60 and the sonotrode 40 or between the sonotrode 40 and the converter member 10.

Figure 13:
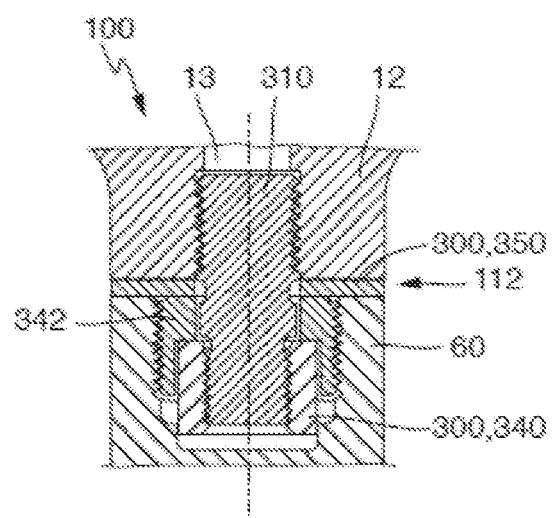

Also in the embodiment according to FIG. 13, a cascade is provided as the connecting element 310. The substantial difference compared to the embodiment according to FIG. 12 is that the second cascade part 342 has a smaller diameter and terminates upward with the amplitude booster 60. For this reason, an insulating washer is provided as an insulating element 350 between the amplitude booster 60 and the converter lower part 12. The insulating washer is made of an insulating material or is provided with an insulating coating, thereby constituting an insulating means 300.

Further, in this embodiment, the second cascade part 342 is not coated. Instead, the first cascade part 340 is provided with an insulating coating on an axial contact surface with the second cascade part 342. Alternatively, in this embodiment, the first cascade part 340 can also consist entirely of an insulating material, for example ceramic. In any case, the first cascade part 340 forms an insulating means 300. In the radial direction, the first cascade part 340 and the second cascade part 342 do not touch one another. Here, too, additional insulating means, for example an insulating sleeve, can be provided.

This type of connection can also be used between the sonotrode 40 and the amplitude booster 60 or between the sonotrode 40 and the converter member 10.

Figure 14:
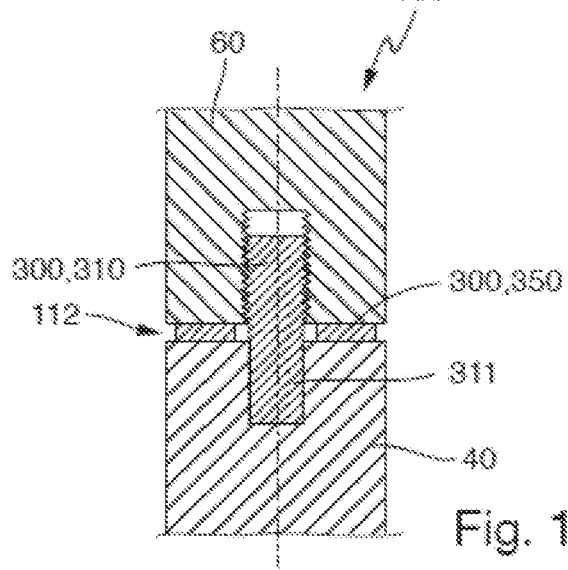

FIG. 14 shows a further embodiment of the ultrasonic tool 100. In this embodiment, a bolt is provided as the connecting element 310 and comprises an outer threaded portion and a smooth portion 311. The smooth portion 311 is provided with an insulating coating and the bolt is shrunk with the smooth portion 311 into a blind bore of the sonotrode 40. In this way, the bolt forms an insulating means 300. The threaded portion of the bolt projects upwards from the sonotrode 40. In this way, the amplitude booster 60 can be screwed onto the threaded portion by means of a threaded bore. An annular insulating washer is also provided as an insulating element 350 at the contact point 112, which washer consists of an insulating material or is provided with an insulating coating and thereby constitutes an insulating means 300. In this way, a galvanic isolation is established between the sonotrode 40 and the amplitude booster 60.

Figure 15:
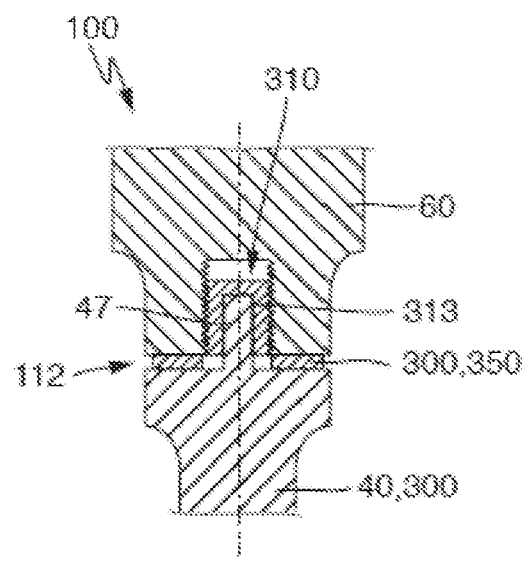

In the embodiment illustrated in FIG. 15, the ultrasonic tool 100 comprises a sonotrode 40 and an amplitude booster 60. An insulating washer is provided as an insulating element 350 at the contact point 112. The insulating washer is annular. The insulating washer is made of an insulating material or is provided with an insulating coating, thereby constituting an insulating means 300.

The sonotrode 40 has a bolt 47 that is integrally produced with the sonotrode 40. The bolt 47 projects upward through the recess of the ring washer. The bolt 47 of the sonotrode 40 is provided with an insulating coating. In this way, the sonotrode 40 forms an insulating means 300. A threaded attachment 313 with an outer thread as the connecting means 310 is shrunk onto the bolt 47. The amplitude booster 60 is screwed onto the outer thread of the threaded attachment 313 by means of a threaded bore.

In alternative embodiments, the insulating panel can be omitted if the entire top side of the sonotrode 40 is provided with an insulating coating.

This type of connection can also be employed in other embodiments between the sonotrode 40 and the converter member 10 or between the amplitude booster 60 and the converter member 10.

Figure 16:
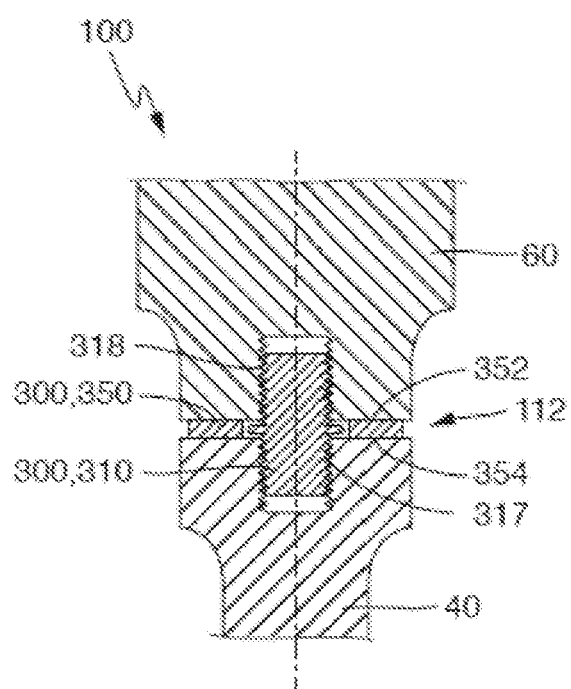

The embodiment shown in FIG. 16 differs substantially from that of FIG. 2 in that the threaded bolt forming the connecting means 310 comprises two outer thread portions 317, 318 that are adjacent in the axial direction, wherein each outer thread portion is provided with an outer thread, wherein the outer threads are isolated from one another and wherein a circumferential bead is provided between the outer thread portions 317, 318 that isolates the outer threads from one another. Only the first outer threaded portion 317 and the bead are coated with an insulating material. In this way, the threaded bolt forms an insulating means 300.

Instead of the insulating washer or instead of a coating on the insulating washer, from among two connected components, in the present case the sonotrode 40 and the amplitude booster 60, at least one can also be provided with an insulating coating or can at least partially consist of an insulating material, in particular on the respective contact surface. Then, either the insulating washer as a whole or the coating thereof can be omitted. The same is true for all embodiments with the insulating washer.

REFERENCE NUMBERS

10 Converter member
11 Converter housing
12 Converter lower part
13, 64 Through-bore
15, 62 Shoulder
16 Cover plate
18 Converter screw
20 Converter
22 piezo element
24 Neutral electrodes
26 Phase electrodes
31 Phase conductor
33 Neutral conductor
35 Protective conductor
39 AC voltage source
40 Sonotrode
42 Sealing surface
44 Signal terminal
46 Outer thread
47 Bolt
48 Transverse bore
49 Blind bore
60 Amplitude booster
66 Shoulder surface
100 Ultrasonic tool
112 Contact point
110 Counter tool
112 Sealing surface
200 Workpiece
300 Insulating means
310 Connecting element/threaded bolts
311 Smooth portion
313 Threaded attachment
314 Inner thread
316 Projection
317 First outer thread portion
318 Second outer thread portion
320 Wire threaded insert
330 Transverse part
332 Threaded bore
340 First cascade part
342 Second cascade part
350 Insulating element
344, 352 Top side
346, 354 Bottom side
356 Flange screw
358 Flange shoulder
360 Adhesive
400 Voltage source
410 Sensor
K Converter axis
R Propagation direction

The invention claimed is:

1. A method for machining a workpiece by means of mechanical ultrasonic oscillations by means of an ultrasonic tool with a converter member and a sonotrode, wherein the converter member comprises a converter having at least one piezo element, wherein the converter member comprises a phase conductor for a supply line of an electrical AC voltage and a neutral conductor, wherein the at least one piezo element is configured so as to convert an electric AC voltage into a mechanical ultrasonic oscillation, wherein the converter member can be set into resonance oscillation with a mechanical ultrasonic oscillation of the wavelength $\lambda$, wherein the converter member is mechanically coupled to the sonotrode and the sonotrode and the converter member are tuned to one another such that the sonotrode can be set into resonance oscillation with the mechanical ultrasonic oscillation of the wavelength $\lambda$, wherein the sonotrode comprises a sealing surface, the sealing surface being provided in order to contact the workpiece to be machined, wherein the sealing surface of the sonotrode and the neutral conductor are galvanically isolated, characterized in that the workpiece is arranged for machining between the sonotrode and a counter tool, and the workpiece is machined by means of the ultrasonic tool, an electrical signal voltage is created on a signal terminal of the sonotrode electrically connected to the sealing surface of the sonotrode, wherein an electrical current flow between the neutral conductor and the signal terminal is prevented, and it is at least temporarily determined whether a current flows between the sonotrode and the counter tool and/or a voltage drops between the sonotrode and the counter tool.

2. The method according to claim 1, wherein the sonotrode comprises an electrically connected signal terminal connected to the sealing surface for an electrical signal voltage, wherein the neutral conductor and the signal terminal are galvanically isolated.

3. The method according to claim 1, wherein the converter member comprises a converter housing, in which the at least one piezo element is arranged, and a protective conductor is provided, wherein the ultrasonic tool comprises a first portion comprising at least the neutral conductor, a second portion comprising at least the protective conductor and the converter housing, and a third portion comprising the sealing surface of the sonotrode and can output or receive a signal voltage via the signal terminal, wherein the second and third portions are galvanically isolated and wherein the first and second portions are additionally galvanically isolated.

4. The method according to claim 3, wherein an insulation housing made of electrically insulating material defining an insulation space is provided in the converter housing,
wherein the at least one piezo element and the neutral conductor are arranged in the insulation space, and
wherein the insulation housing is toroidal or cylindrically hollow.

5. The method according to claim 1, wherein a counter tool is provided with a sealing surface, which is positioned such that the workpiece to be machined can be arranged between the sealing surface of the sonotrode and the sealing surface of the counter tool during machining, and wherein the sealing surface of the counter tool is grounded.

6. The method according to claim 3, wherein a voltage source is provided, with which the third portion can be subjected to a signal voltage, wherein a sensor is provided for detecting an electrical charge applied to the third portion or an electrical charge dissipated from the third portion.

7. The method according to claim 6, characterized in that the signal voltage is a DC voltage and is less than 30 V.

8. The method according to claim 3, characterized in that the third portion is connected to the voltage source by means of an electrical line, which is shielded and/or whose total capacity is <2500 pF.

9. The method according to claim 3, characterized in that an insulation resistance between the second portion and the third portion is at least 5 kΩ.

10. The method according to claim 1, characterized in that an amplitude booster is provided between the converter member and the sonotrode, wherein the converter member is mechanically coupled to the amplitude booster and the amplitude booster is mechanically coupled to the sonotrode, wherein the sonotrode, the amplitude booster, and the converter member are tuned to one another such that the sonotrode can be set into resonance oscillation with the mechanical ultrasonic oscillation of the wavelength λ.

11. The method according to claim 1, characterized in that a bracket is provided, which engages the sonotrode, the converter member, and/or the amplitude booster.

12. The method according to claim 1, characterized in that at least one insulating means is provided, which causes the sealing surface of the sonotrode and the neutral conductor to be galvanically isolated.

13. The method according to claim 12, characterized in that at least one insulating means is provided at exactly two positions at a contact point between the converter member, sonotrode, and/or amplitude booster and at a connection point of the converter member, sonotrode, and/or amplitude booster.

14. The method according to claim 12, characterized in that the converter member and sonotrode and/or converter member and amplitude booster and/or amplitude booster and sonotrode are connected to one another via at least one connecting element, namely a screw and/or a threaded bolt and/or a threaded bushing, with a clamping force of at least 20 kN and less than 150 kN, and the connecting element is configured as an insulating means and is at least partially provided with an insulating coating and/or at least partially consists of an insulating material.

15. The method according to claim 12, characterized in that at least one insulating element, in particular an insulating washer, is provided between the converter member and the sonotrode, in particular between the converter member and the amplitude booster and/or between the amplitude booster and the sonotrode, which insulating element is at least partially configured as an insulating means and consists at least partially of an insulating material and/or is at least partially provided with an insulating coating.

16. The method according to claim 12, characterized in that the converter member and/or the amplitude booster and/or the sonotrode is configured as an insulating means and at least partially consists of an insulating material and/or is at least partially provided with an insulating coating.

17. The method according to claim 14, characterized in that a cascade of several components is provided as the connecting element, wherein a first cascade part is held by a second cascade part in the propagation direction by means of a form fit and the first cascade part and/or the second cascade part is provided with an insulating coating on the respective contact surface for the form fit.

18. The method according to claim 14, characterized in that the connecting element comprises a smooth portion, which is provided with an insulating coating, wherein this portion is shrunk into the sonotrode or converter member or amplitude booster.

19. The method according to claim 10, characterized in that a through-bore is provided in the amplitude booster, wherein the amplitude booster comprises a portion provided with an insulating coating, wherein a screw is further provided that rests with its head on the coated portion, is spaced apart from an inner surface of the through-bore, and is screwed with its thread into the converter member or the sonotrode.

20. The method according to claim 1, characterized in that a transverse bore is provided in the converter member or the amplitude booster or the sonotrode, in which an at least partially coated transverse part is inserted with a threaded bore, wherein, in addition to the transverse bore, the converter member, the amplitude booster, or the sonotrode comprises a bore concentric to the threaded bore, in which a screw or a threaded bolt is arranged, wherein the screw or the threaded bolt is connected to the transverse part by means of the threaded bore.

21. The method according to claim 12, characterized in that a coupling piece is provided as an insulating means, the coupling piece being fastened to the converter member or the amplitude booster or the sonotrode by means of screws, wherein the coupling piece is provided with the insulating coating where the screws are supported.

22. The method according to claim 14, characterized in that the insulating coating and/or the insulating material includes at least one of the following materials: ceramic, in particular chromium oxide ($Cr_2O_3$) or aluminum oxide ($Al_2O_3$), glass, polymer composites, in particular glass reinforced plastic (GRP), and carbon reinforced plastic (CRP).

23. The method according to claim 14, characterized in that the connecting element is a bolt having two outer thread portions adjacent in the axial direction, wherein each outer thread portion is provided with an outer thread, wherein the outer threads are isolated from one another and wherein at least one of the outer thread portions is coated with an insulating material.

24. The method according to claim 14, characterized in that the connecting element is a screw or a threaded bolt with an additional ring washer, wherein the screw or the threaded bolt and the ring washer are either configured as a one-piece or multi-piece unit, wherein the screw or the threaded bolt and the ring washer are each configured as insulating means and consist at least partially of an insulating material and/or are at least partially coated with an insulating material.

25. The method according to claim 14, characterized in that the connecting element is an element that engages with an outer peripheral surface.

26. The method according to claim 13, characterized in that the converter member and sonotrode and/or converter member and amplitude booster and/or amplitude booster and sonotrode are connected to one another via an insulating adhesive, wherein the connecting element is connected in particular to the converter member and/or the sonotrode and/or the amplitude booster via an insulating adhesive.

27. The method according to claim 24,
characterized in that a duration is determined for at least one current flow and/or voltage drop between the sonotrode and counter tool and, if the duration exceeds a predefined time limit, the current flow and/or voltage drop is evaluated as a contact between the sealing surfaces with a contact time that corresponds to the duration of the current flow or voltage drop.

28. The method according to claim 24,
characterized in that a current strength is determined for at least one current flow and/or voltage drop between the sonotrode and the counter tool, and if the current exceeds a predefined current limit, the current flow and/or voltage drop is evaluated as a contact between the sealing surfaces.

29. The method according to claim 24,
characterized in that at least one of the following parameters is determined for at least a predetermined period of time wherein the parameter is stored and/or outputted:
  total number of contacts between the sonotrode and counter tool
  longest contact time of all contacts
  sum of contact times of all contacts.

30. The method according to claim 29
characterized in that, depending on one or more of the parameters, the position of the ultrasonic tool is adjusted, a force applied to the sonotrode is reduced or increased, an alert is outputted, and/or the machining operation is stopped.

* * * * *